UNITED STATES PATENT OFFICE.

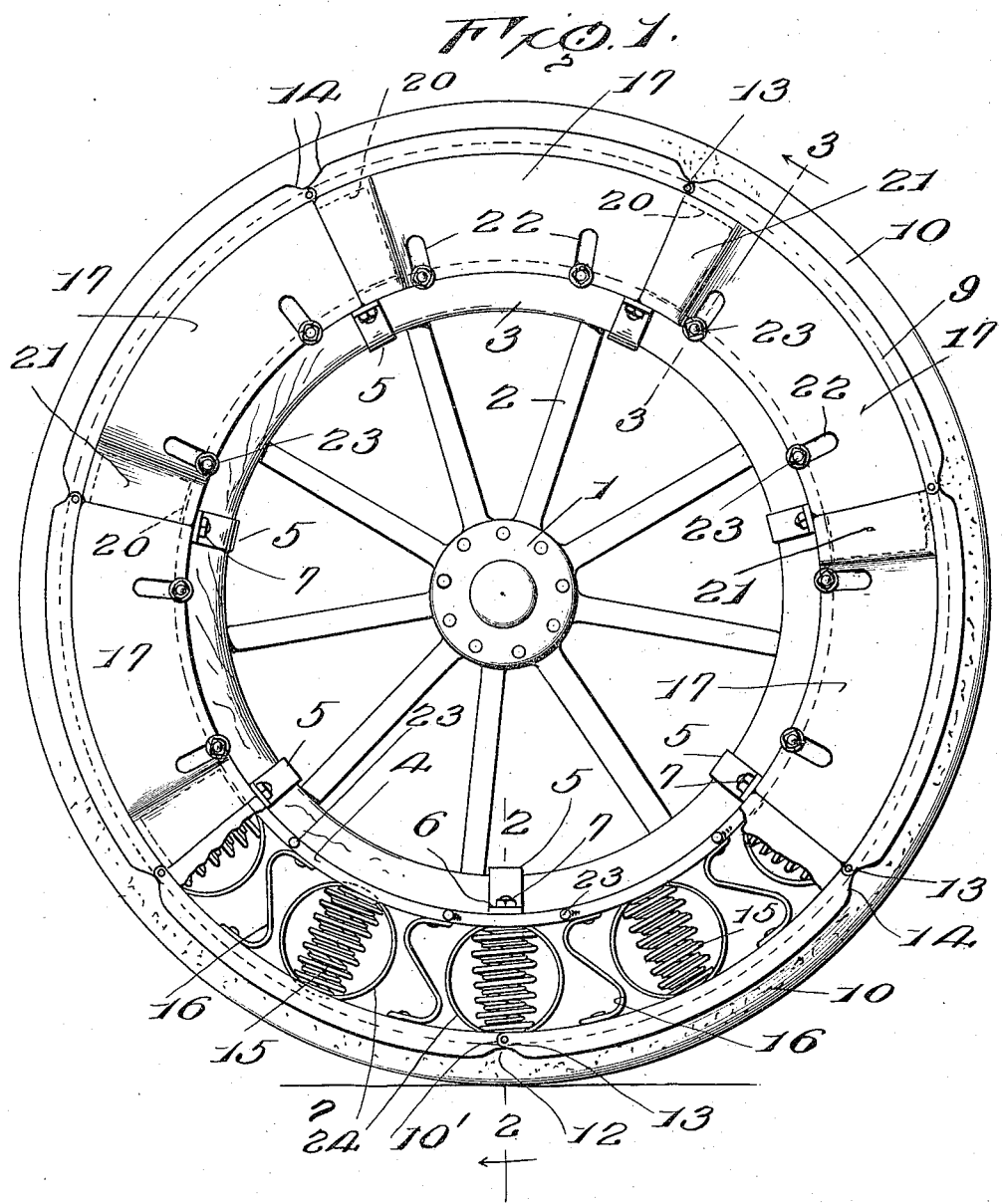

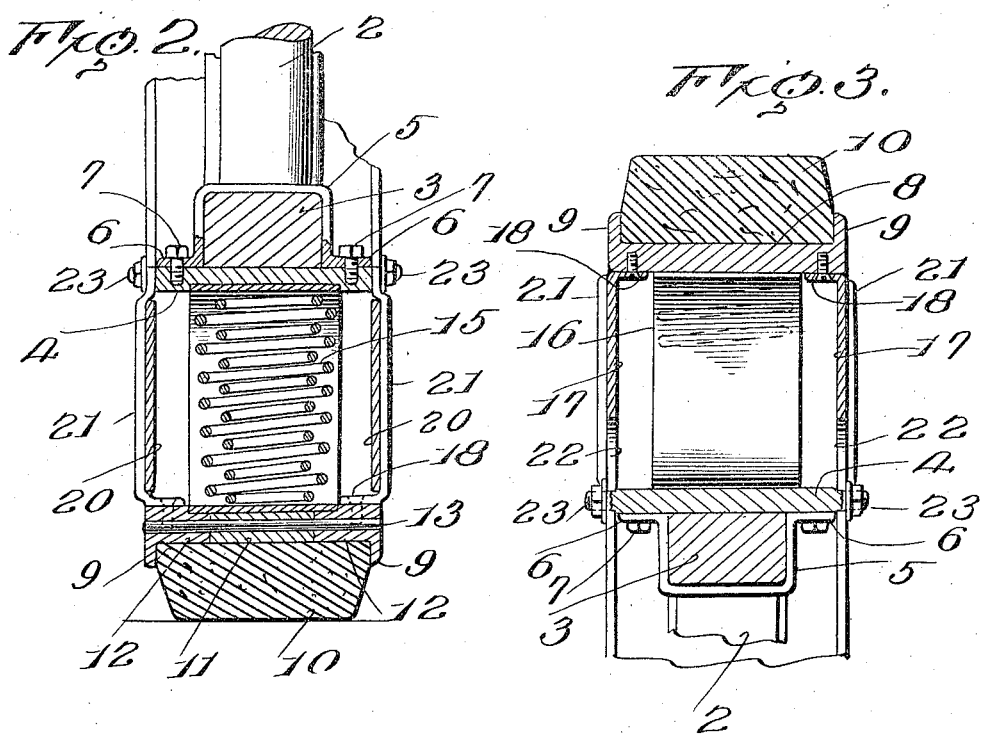
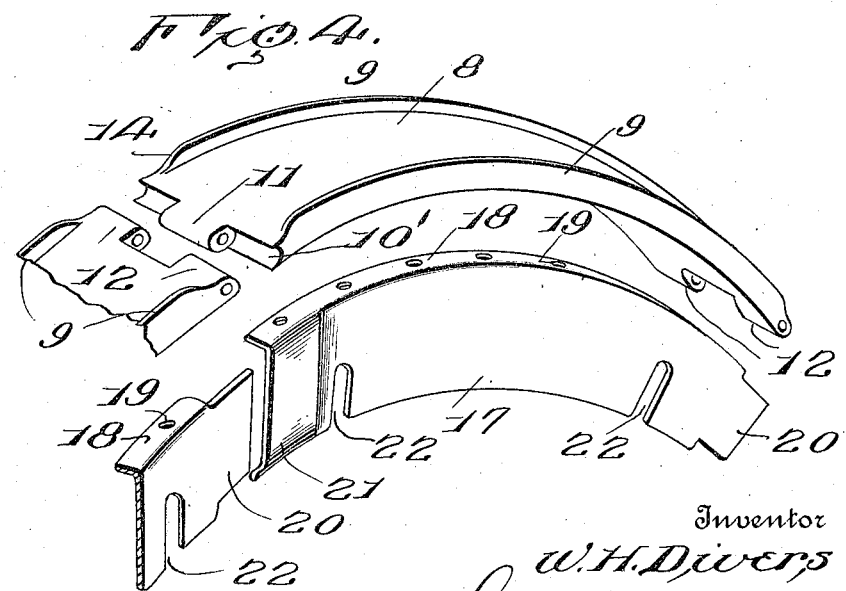

WILLIAM H. DIVERS, OF CRANE, OREGON.

RESILIENT TIRE.

1,300,933. Specification of Letters Patent. Patented Apr. 15, 1919.

Application filed August 5, 1918. Serial No. 248,367.

*To all whom it may concern:*

Be it known that I, WILLIAM H. DIVERS, a citizen of the United States, residing at Crane, in the county of Harney and State of Oregon, have invented certain new and useful Improvements in Resilient Tires, of which the following is a specification.

This invention relates to resilient tires and has for its object the provision of a tire which may be readily applied to the felly of a wheel and which will possess easy riding qualities and will not be easily put out of order.

The invention is illustrated in the accompanying drawings, in which—

Figure 1 is a side elevation, with parts removed, of a wheel having my improved tire applied thereto;

Fig. 2 is a transverse section on the line 2—2 of Fig. 1;

Fig. 3 is a transverse section on the line 3—3 of Fig. 1;

Fig. 4 is a detail perspective view of portions of the side plates and tread cushion-carrying members.

The wheel may be of any well-known construction and as illustrated comprises a hub 1, spokes 2 radiating therefrom, and a felly 3 carried by the outer ends of the spokes. In carrying out my invention, I employ an annular base or tire-carrying member 4 which may be a single integral ring or band or may be a plurality of connected segments as may be preferred or necessitated by the exigencies of any particular circumstance. This annular base or tire-supporting member is placed over the felly so as to encircle the outer circumference of the same and is wider than the felly so that its side edges will project beyond the sides of the felly, as clearly shown in Figs. 2 and 3. At any desired intervals around the felly, I provide stirrups or clips 5 which are substantially U-shaped so as to fit to the inner circumference and the sides of the felly and are provided at their extremities with lateral ears or lugs 6 through which securing bolts or screws 7 are inserted into the base member 4 to secure the said member firmly to the felly. Spaced from and encircling the base member 4 is a tread cushion-carrying member consisting of a series of segmental or arcuate plates 8 having outstanding flanges 9 at their side edges which may be of the well-known clencher formation if desired so as to retain and hold a tread cushion 10 of rubber or other elastic material. The arcuate plates 8 are each provided at one end with a concave groove or recess 10′ and with a central hinge lug 11, while at the opposite end it is provided with spaced hinge lugs 12, the spaced lugs on one plate being designed to register or aline with the central lug on the meeting end of the adjacent plate and receive a pintle 13 whereby the adjacent plates or segments will be hingedly connected. The outer surfaces of the hinge lugs are convex and fit closely within the concave end surfaces of the adjacent plates so that relative movement of the plates will be permitted but the access of dirt into the joint will be prevented. The tread cushion 10 is preferably continuous so that it serves as a cover for the joints, but obviously the ends of the flanges 9 must be beveled or cut-away so as to accommodate the relative movement of the segments and the close fit between the segments will resist the entrance of sand or other forms of dirt through the space between the beveled ends of the flanges which are shown at 14. It will, of course, be understood that the cushion tread-carrying member may be made in any desired number of sections, but I have found seven sections to be an advantageous number and prefer such construction which is illustrated in the drawings. The cushion tread-carrying member is supported upon the base 4 by coil springs 15 and resilient braces 16 which are arranged alternately and are provided in such numbers, preferably, that a conical coil spring is located at the center of each plate 8 and also under each joint between the meeting ends of adjacent plates. The conical coil springs 15 are preferably double, that is to say, at each point of location of a coil spring there are two springs, one of greater diameter than the other so that the springs may be arranged concentrically one within the other, as clearly shown in Figs. 1 and 2. The resilient braces 16 are spring metal plates bent into substantially S-shape and having their opposite ends riveted or otherwise secured to the base 4 and the plates 8, respectively. The springs are protected against damage by accidental blows from flying stones or other missiles and against an accumulation of grease and dirt by side cover plates 17 which are provided in the same number as the plates 8 and are provided at their outer edges with lateral flanges 18 provided with perforations 19 adapted to fit against the inner surface of the adjacent plate 8 and be secured thereto by rivets or equivalent devices. One end of each side plate 17 is constructed with a reduced extension or tongue 20 and the opposite end has an off-set portion 21 adapted to fit over the tongue on the meeting end of the adjacent plate so that the inner surfaces of the side plates will be flush throughout the extent of the tire. In the inner edge portions of the side plates, I provide open-ended slots or notches 22 disposed on radii of the plates and adapted to engage headed studs or bolts 23 inserted in the edges of the base member 4, as will be readily understood. These headed studs or bolts and slots provide for the necessary relative movements of the side plates when the tire is under compression and also hold the side plate to the base member so that the tire will not be displaced and dirt cannot work into the space between the sides of the tire and injure the springs or prevent the desired free action of the same. To further strengthen the tire, I provide arcuate spring braces 24 which are arranged at opposite sides of the coil springs and, in a measure, serve as casings for the same. It will be understood, of course, that these arcuate braces may be connected or may have opposed ends separated at the base and tread members.

It will be readily noted from the foregoing description, taken in connection with the accompanying drawings, that I have provided an exceedingly simple resilient tire which will possess all the easy riding qualities of a pneumatic tire and will not be susceptible to the disadvantages of the same.

The several springs will firmly support the tread portion of the tire and at the same time will permit the same to yield to obstructions in the road or any inequalities of the surface over which the vehicles travel. The tire may be easily applied to any felly and if through some unavoidable causes a tire should be rendered useless the damaged tire may be very quickly and easily removed from the felly and a new tire substituted therefor, the only work needed being the removal of the securing screws or bolts 7 and the turning home of said bolts after the new tire has been placed in position. Breaking of the springs from extraneous cause is not apt to occur inasmuch as the side plates entirely inclose and protect the same so that about the only factor of damage which may cause breaking of the spring is overloading of the vehicle equipped with the tires.

Having thus described my invention, what is claimed as new is:—

In a resilient tire, the combination of an annular base adapted to be secured around the felly of a wheel, hingedly connected tread members spaced from the base member, coil springs disposed between the base member and the tread members, arcuate spring braces disposed between the base member and the tread members at the sides of the coil springs, and S-shaped resilient braces having their opposite ends secured, respectively, to the base member and the tread members, said braces being arranged alternately with said springs.

In testimony whereof I affix my signature.

WILLIAM H. DIVERS. [L. S.]

Copies of this patent may be obtained for five cents each, by addressing the "Commissioner of Patents, Washington, D. C."